United States Patent Office.

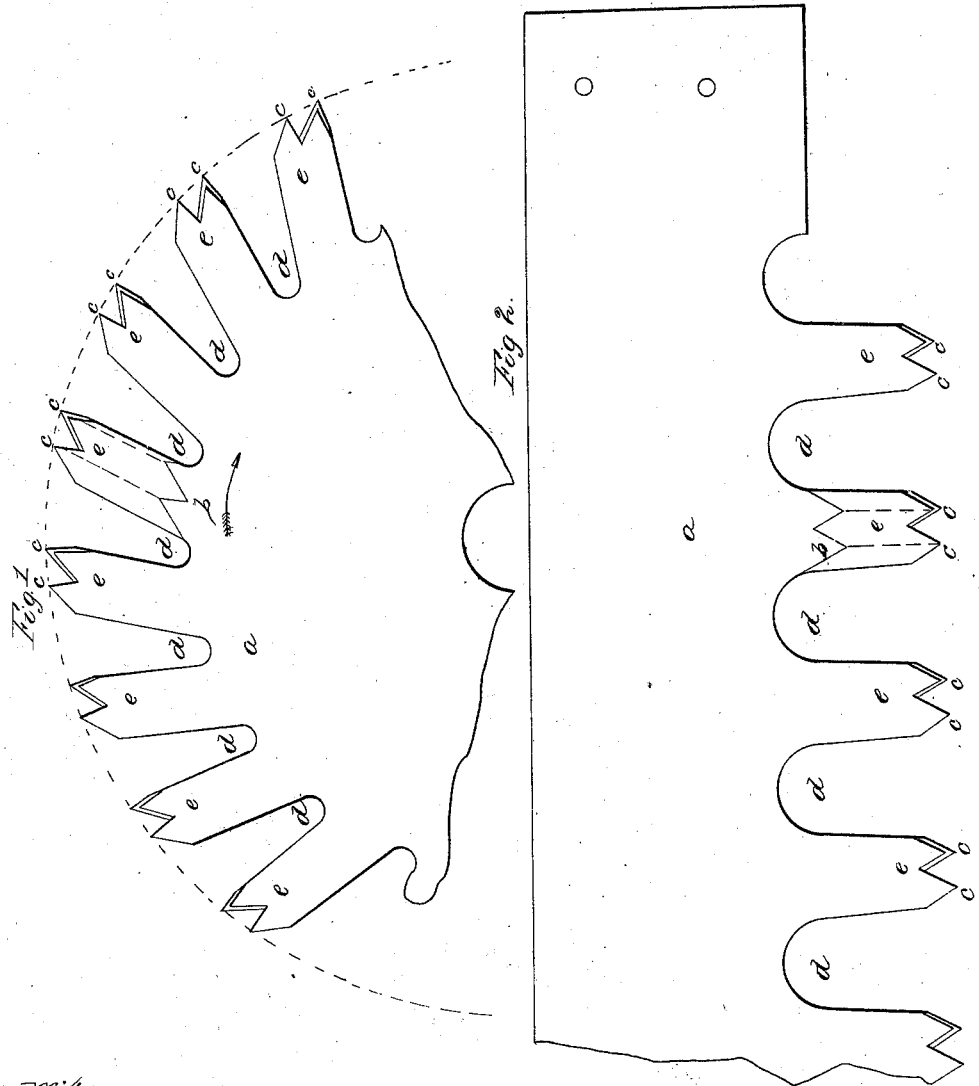

WARREN P. MILLER, OF NEW YORK, N. Y.

Letters Patent No. 81,812, dated September 1, 1868.

IMPROVEMENT IN SAWS.

The Schedule referred to in these Letters Patent and making part of the same.

TO ALL WHOM IT MAY CONCERN:

Be it known that I, WARREN P. MILLER, of the city, county, and State of New York, have invented a new and useful Improvement in Saws; and I do hereby declare that the following is a full, clear, and exact description of the construction and operation of the same, reference being had to the annexed drawings, making a part of this specification, in which—

Figure 1 represents a section of a circular saw with the improved teeth.

Figure 2 shows a section of a straight saw, such as are used for cutting off logs, and like purposes, with my improved teeth.

Like letters refer to like parts on the drawings.

Letters $a\ a$ are the saw-plate.

Letters $b\ b$ show the position of the teeth when filed down to the bottom of cavity.

Letters $c\ c\ c\ c$, the points of the teeth.

Letters $d\ d\ d\ d$, cavities between each set of teeth.

Letters $e\ e\ e\ e$, base of the teeth.

The object of this invention is to produce a saw simple in construction, easily kept in order, and that will not need frequent gumming; and it consists in forming the teeth in pairs, of small dimensions, on a portion of the plate, with spaces between the different pairs of teeth, cut deep into the saw-plate. These pairs of teeth are what are termed scoring-teeth, and are short from base to point, which form makes them much less liable to bend or spring laterally in the operation of sawing than the common tooth.

I prepare the saw-plates in the same manner, and of the same materials, as is used for saws when provided with teeth of any of the known forms. I lay off the teeth in pairs or sets, as shown at $c\ c\ c\ c$, leaving a space between each pair equal to or greater in width than that comprising the two teeth, i. e., one set of teeth, as shown at $e\ e\ e\ e$. The metal occupying the space at $d\ d\ d\ d$ is then cut away, and also other portions of the saw-plate necessary to form the teeth $c\ c\ c\ c$, and leaving that portion of the saw-plate on which the pairs of teeth are formed with parallel sides, in order that, as the teeth are filed away in keeping them sharp, they will always have a uniform size in width, till worn far into the saw-plate, and below the base of the teeth at the commencement, thus entirely doing away with the necessity of frequent and uncertain process of gumming, as in saws of common construction.

After the plates are tempered, ground, and smithed, the teeth $c\ c\ c\ c$ are filed fleaming, as shown, and each tooth of each set is sprung laterally in opposite directions, so as to cut more than equal to the thickness of the plate.

The object of locating the teeth in pairs, and making them smaller than have been heretofore used in the same class of saws, is—

First, that the lateral resistance of the timber to the passage of the saw will apply at as nearly opposite points as possible on the saw-plate. The teeth being the points where resistance applies, it is evident that, the nearer the teeth are together, the less the plate will be affected by the side pressure.

Second, being short from point to base, the teeth are rendered immensely stiffer laterally, and are enabled to retain the set given them.

Third, the spaces $d\ d\ d$ are equal to one-half the stock in the edge of the plate, and, having been cut away, reduce the amount of filing in a corresponding degree.

Fourth, it is known that filing into the edge of a saw-plate affects the stiffness and stability of it, and makes re-hammering frequently necessary. It will be observed that this improved saw cannot be affected by filing the teeth until the saw is nearly worn out.

Fifth, for reason of the great lateral stiffness of saw-teeth when arranged in pairs, as shown, they will not dodge knots, nor follow the grain of the timber, but cut straight and smooth, and run with less power than other saws.

I am aware that saws have been constructed with teeth in pairs, like what is seen in the Tuttle and Lippincott saws, but such saws have a slot cut deep into the plate, between the points of such pairs of teeth. Such construction I wish to avoid, because the slot between such pairs of teeth elongates the teeth from their points to the bottom of the slot, making them just as liable to spring laterally as though they were long teeth, a defect that my improvement is calculated to entirely avoid.

I am also aware that saws have been constructed with sets of teeth, of three or more, having a deep opening in the plate, between such sets of teeth, and having what is called a clearing-tooth in each set. Such construction I do not claim, as my improvement, in part, is to do away with the clearing-teeth.

What I do claim as new, and desire to secure by Letters Patent, is—

A saw, with the teeth $c$ $c$ in pairs on base, $e$, having parallel sides, and deep spaces, $d$, between the pairs of teeth, constructed and arranged to operate in the manner and for the purpose described.

WARREN P. MILLER.

Witnesses:
 DAVID M. EDSALL,
 JNO. S. WOODWARD.